(12) United States Patent
Besharat et al.

(10) Patent No.: US 6,556,131 B1
(45) Date of Patent: Apr. 29, 2003

(54) METHOD FOR INDICATING THAT ONLY A PORTION OF A RECEIVED MESSAGE CAN BE DISPLAYED AND COMMUNICATION DEVICE EMPLOYING SAME

(75) Inventors: Mohammad Besharat, Boynton Beach, FL (US); Jochen G. Winzer, Dresden (DE)

(73) Assignees: Motorola, Inc., Schaumburg, IL (US); Timex Corporation, Middlebury, CT (US)

( * ) Notice: Subject to any disclaimer, the term of this patent is extended or adjusted under 35 U.S.C. 154(b) by 0 days.

(21) Appl. No.: 09/511,261

(22) Filed: Feb. 23, 2000

(51) Int. Cl.$^7$ .............................. G08B 5/22; H04Q 1/30; H04Q 7/00; H04Q 1/18; G09G 5/00

(52) U.S. Cl. .................. 340/7.55; 340/7.56; 455/158.4; 345/618

(58) Field of Search ................................ 340/7.55, 7.56, 340/7.44, 7.61; 714/48; 345/115, 618; 455/31.4, 158.4

(56) References Cited

U.S. PATENT DOCUMENTS

| | | | | |
|---|---|---|---|---|
| 4,646,081 A | * | 2/1987 | Tsunoda ................. | 340/825.44 |
| 5,159,331 A | * | 10/1992 | Park et al. .............. | 340/825.44 |
| 5,185,604 A | * | 2/1993 | Nepple et al. .......... | 340/825.44 |
| 5,359,317 A | * | 10/1994 | Gomez et al. ......... | 340/825.44 |
| 5,410,302 A | * | 4/1995 | Dulaney, III et al. ... | 340/825.44 |
| 5,602,563 A | * | 2/1997 | Chang et al. ................ | 345/115 |
| 5,630,207 A | * | 5/1997 | Gitlin et al. ................ | 455/54.1 |
| 5,726,642 A | * | 3/1998 | Kudoh et al. ........... | 340/825.44 |
| 5,872,521 A | * | 2/1999 | Lopatukin et al. ...... | 340/825.44 |
| 6,148,177 A | * | 11/2000 | Faris et al. ................. | 455/31.1 |
| 6,184,796 B1 | * | 2/2001 | Rivero et al. .......... | 340/825.44 |
| 6,201,526 B1 | * | 3/2001 | Burgan ........................ | 345/124 |
| 6,351,656 B1 | * | 2/2002 | Burgan et al. .............. | 455/566 |

* cited by examiner

*Primary Examiner*—Brian Zimmerman
*Assistant Examiner*—Nam Nguyen
(74) *Attorney, Agent, or Firm*—Randi L. Dulaney

(57) ABSTRACT

A communication device (100) employs a method and apparatus for indicating to a user of the communication device that only a portion of a received message (120) can be displayed to the user. Some time after receipt of a message, the communication device displays a portion of the received message and one of at least two different truncation symbols in the event that the entire message cannot be displayed. Each truncation symbol indicates to the user a particular reason why the entire received message could not be displayed. For example, if the entire message could not be decoded reliably, the communication device displays a portion of the message and a message error truncation symbol. Alternatively, if a length of the received message exceeds an amount of memory allocated for the message, the communication device displays a portion of the message and a message length truncation symbol.

17 Claims, 3 Drawing Sheets

METHOD FOR INDICATING THAT ONLY A PORTION OF A RECEIVED MESSAGE CAN BE DISPLAYED AND COMMUNICATION DEVICE EMPLOYING SAME

FIELD OF THE INVENTION

The present invention relates generally to wireless communication devices and, in particular, to a communication device employing a method for indicating to a user of the communication device that only a portion of a received message can be displayed to the user.

BACKGROUND OF THE INVENTION

Display-based wireless communication devices, such as pagers, radiotelephones, two-way radios, and wireless data devices, are well known. Such devices enable users to, inter alia, view received alpha-numeric messages, such as telephone numbers, electronic mail, and short messages. In certain circumstances, however, a received message cannot be completely displayed to the user of the device. For example, if a message has been corrupted during transmission due to being transmitted over a poor quality communication channel (e.g., a channel with a high level of interference), the communication device may not be able to properly decode the entire transmitted message. In such a case, the communication device can only display the portion of the message that has been decoded reliably. As another example, the communication device may have received an entire message reliably, but may not have enough memory available to store the entire message. Consequently, the communication device can only display the portion of the message that can be stored in memory.

To indicate to the user that a received message had to be truncated for some reason, the communication device appends a truncation symbol to the end of the displayed, truncated message. Prior art devices use the same truncation symbol to indicate the display of a truncated message, regardless of the cause of the truncation. Consequently, the user, upon viewing the truncation symbol, cannot determine the cause of the truncation and, therefore, cannot attempt to take corrective action to resolve the problem resulting in the truncation.

Therefore, a need exists for a communication device and method employed therein that indicates to a user of the communication device the cause for truncating a message when a truncated message is displayed.

DETAILED DESCRIPTION OF A PREFERRED EMBODIMENT

Generally, the present invention encompasses a communication device and a method employed therein to indicate to a user of the communication device that only a portion of a received message can be displayed to the user. Some time after receipt of a message, the communication device displays a portion of the received message and one of at least two different truncation symbols in the event that the entire message cannot be displayed to the user. Each truncation symbol indicates to the user a particular reason why the entire received message could not be displayed. For example, in the event that the entire message could not be decoded reliably by the communication device, the communication device displays only the portion of the message that was received and decoded before unreliable decoding began and a message error truncation symbol. Alternatively, in the event that a length of the received message exceeds an amount of memory allocated for the message, the communication device displays only the portion of the message that could be stored in the memory and a message length truncation symbol. By displaying such different truncation symbols, the present invention enables the user of the communication device to quickly determine the reason why a particular displayed message is being truncated and thereby possibly take corrective action, in contrast to prior art approaches that provide a single truncation symbol in all truncation situations thereby rendering it virtually impossible for the user to determine the basis for the truncation.

Figure 1:
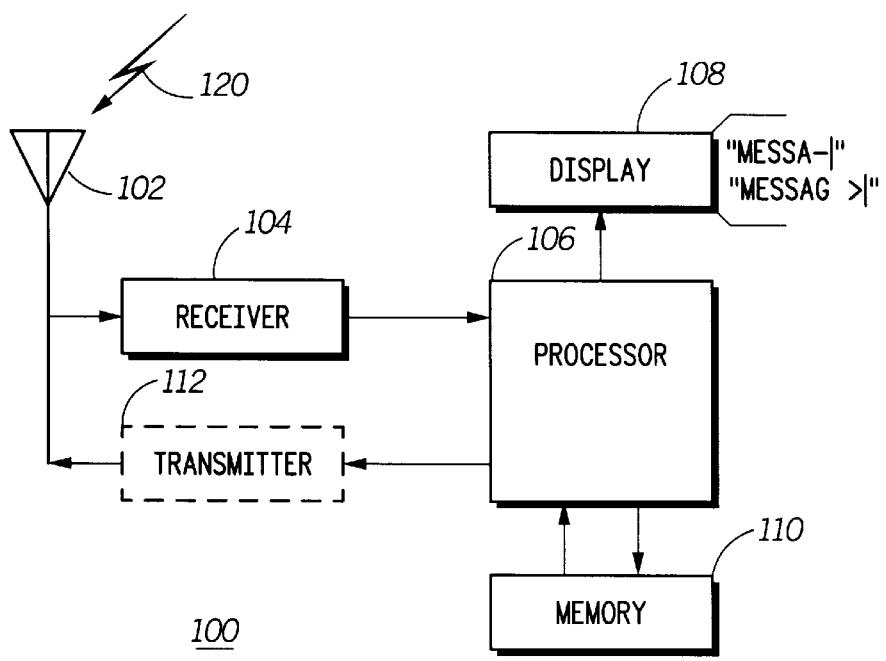
FIG. 1 illustrates a block diagram of a communication device in accordance with a preferred embodiment of the present invention.

The present invention can be more fully understood with reference to FIGS. 1–4, in which like reference numerals designate like items. FIG. 1 illustrates a block diagram of a communication device 100 in accordance with a preferred embodiment of the present invention. The communication device 100 includes, inter alia, an antenna 102, a receiver 104, a processor 106, a display 108, a memory 110, and optionally (i.e., when the communication device 100 is capable of two-way operation) a transmitter 112. All of these elements are well-known. For example, the receiver 104 includes filters, mixers, small-signal amplifiers, a demodulator, and other known elements necessary to produce an analog or digital baseband representation of a message 120 received by the antenna 102. The transmitter 112 includes filters, mixers, a modulator, large-signal amplifiers, and other known elements to produce a radio frequency or microwave signal representation of user information to be conveyed to the infrastructure of the system that the communication device 100 is operating in or to another communication device. The processor 106 preferably comprises a microprocessor and/or a digital signal processor that operates in accordance with stored software programs.

The display 108 preferably comprises a liquid crystal display or other similar display capable of producing, responsive to processor signaling, graphical displays or alpha-numeric displays. The memory 110 preferably includes random access memory (RAM) for temporary storage of the received message 120 or at least a portion thereof, and various other forms of memory, such as read only memory (ROM), programmable ROM (PROM), and electronically-erasable PROM, for more permanent storage of software programs utilized by the processor 106. The primary novelty of the present invention as it pertains to the communication device 100 resides in a software algorithm stored in the memory 110 and executed by the processor 106. As depicted in FIG. 1 and described above, the preferred communication device 100 might comprise a one-way or two-way pager, a one-way or two-way radio, a radiotelephone, or a wireless data device, such as a personal digital assistant (PDA) or a laptop or palmtop computer that includes or is coupled to a wireless modem.

Operation of the preferred communication device 100 occurs substantially as follows in accordance with the present invention. The antenna 102 receives a message 120 from another communication device or the communication system infrastructure (neither of which is shown). The message 120 preferably comprises a data message, such as a short message, transmitted from the originator using a protocol compatible with the system in which the communication device 100 is operating. For example, if the communication device 100 is a pager, the message 120 may have been transmitted using a protocol such as the well-known Post Office Code for Standardization Advisory Group (POCSAG) protocol or the "FLEX" or "REFLEX" protocols developed by Motorola, Inc. of Schaumburg, Ill. Alternatively, if the communication device 100 is a radiotelephone, the message 120 may have been transmitted using a packet data protocol used in any one of various digital radiotelephone systems, including, but not limited to, the Global System for Mobile Communications (GSM), the United States Digital Cellular System employing the Telecommunications Industry Association/Electronic Industries Association (TIA/EIA) Interim Standard 54 (IS-54), the Code Division Multiple Access System employing TIA/EIA Interim Standard 95 (IS-95), or the "iDEN" system that is commercially available from Motorola, Inc. A message 120 constructed using Motorola's "FLEX" protocol is depicted generally in FIG. 2.

The antenna 102 provides the received message 120 to the receiver 104, which downconverts and demodulates it to produce a bit or symbol stream in accordance with well-known techniques. The receiver 104 provides the bit or symbol stream to the processor 106 for decoding and other processing. Although depicted in FIG. 1 as a single block, the processor 106 as described herein may be distributed throughout various elements of the communication device 100. For example, decoding functionality of the processor 106 may reside in the receiver 104 and encoding functionality (if the communication device is a two-way device with such functionality) may reside in the transmitter 112.

Upon receiving the bit or symbol stream from the receiver 104, the processor 106 begins decoding the stream and storing the decoded bits in the memory 110 for future display to the user of the communication device 100. As the processor 106 decodes and stores the received message 120, it checks for certain events. In accordance with the present invention, one such event is unreliable decoding of at least a portion of the received message 120 and another such event is excessive message length.

In the event that the processor 106, while decoding, determines that a portion of the received message cannot be decoded reliably (e.g., has an unacceptable number of bit errors as determined pursuant to a cyclic redundancy check, frame check sequence, or other known technique), the processor 106 stores both the portion of the message 120 decoded prior to such determination and a respective truncation symbol in the memory 110. In a preferred embodiment, the truncation symbol associated with a message error is a "T" rotated ninety degrees (e.g., "- - - |"); however, any other symbol or character may be used. Some time after the processor 106 stores the message portion and the message error truncation symbol in memory 110, the processor 106 instructs the display 108 to display the stored message portion and the message error truncation symbol to the user. Depending on the present configuration of the communication device 100, the delay between storage and display may be negligible (e.g., when the user desires immediate notification and display of received messages) or substantial (e.g., when the user desires display only upon the user's request as indicated through user controls (not shown)).

Figure 2:
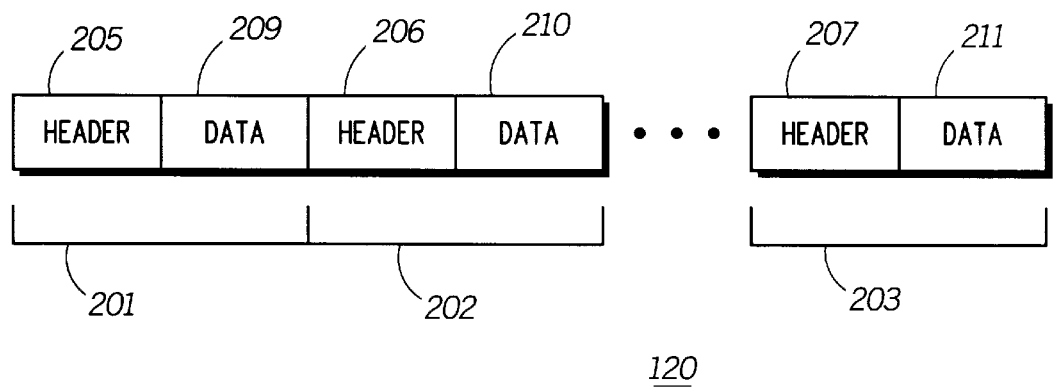
FIG. 2 illustrates the contents of a message received by a pager embodiment of the communication device of FIG. 1.

For example, if the communication device 100 is a one-way pager operating in accordance with Motorola's "FLEX" protocol, the received message 120 is divided into a plurality of message fragments 201–203 as shown in FIG. 2. Each message fragment 201–203 includes a header 205–207 and corresponding data 209–211. As the message fragments 201–203 are provided to the processor 106, the processor 106 first attempts to decode the header 205–207 and then, upon successful decoding of the header 205–207, decodes the data 209–211. In the event that the processor 106 cannot reliably decode a header (e.g., header 206), the processor 106 stores only the data 209 that was reliably decoded prior to receipt of the unreliable header 206 together with the message error truncation symbol, and instructs the display 108, either immediately or at some later time responsive to user input, to display the reliably decoded data 209 and the message error truncation symbol to the user.

Besides truncation due to message errors, a received message 120 may also have to be truncated due to message length. As communication devices get smaller and smaller while maintaining or even enhancing functionality, the available memory for any particular message inherently decreases, thereby increasing the likelihood that received messages will have to be truncated due to excessive length. Therefore, in accordance with a preferred embodiment of the present invention, the processor 106 tracks the remaining amount of memory 110 allocated to the message 120 as the processor 106 decodes and stores portions of the message 120. In the event that the memory 110 allocated to the message 120 is exhausted prior to complete decoding and storage of the entire message 120 (i.e., the length of the message 120 exceeds a threshold length associated with the available memory), the processor 106 stores a message length truncation symbol in the memory 110 together with the decoded portion of the message 120 for which memory was available. The processor 106 then, at the appropriate time in accordance with the communication device's configuration, instructs the display 108 to display the stored message portion and the message length truncation symbol. The message length truncation symbol preferably comprises a backward K, although any other character or symbol may be used. The only restriction on the message length truncation symbol is that it be different than the message error truncation symbol to enable the user to differentiate between truncation causes.

As described above, the present invention provides a means for a user to quickly determine why a particular received message has been truncated by the user's communication device. By viewing the truncation symbol and associating the truncation symbol with a particular cause (e.g., by referencing a cause versus truncation symbol table in a communication device user's manual), the user can determine if action can be taken to correct the problem causing the truncation. For example, if the user determines by viewing the truncation symbol that a message has been truncated due to message length, the user might be able to delete stored messages to make more memory available for newly received messages. Such corrective action cannot be taken if only one truncation symbol is used for all truncations as in the prior art because the user cannot distinguish between, for example, a message error truncation for which remedial action may not be available and a message length truncation for which remedial action may be available.

Figure 3:
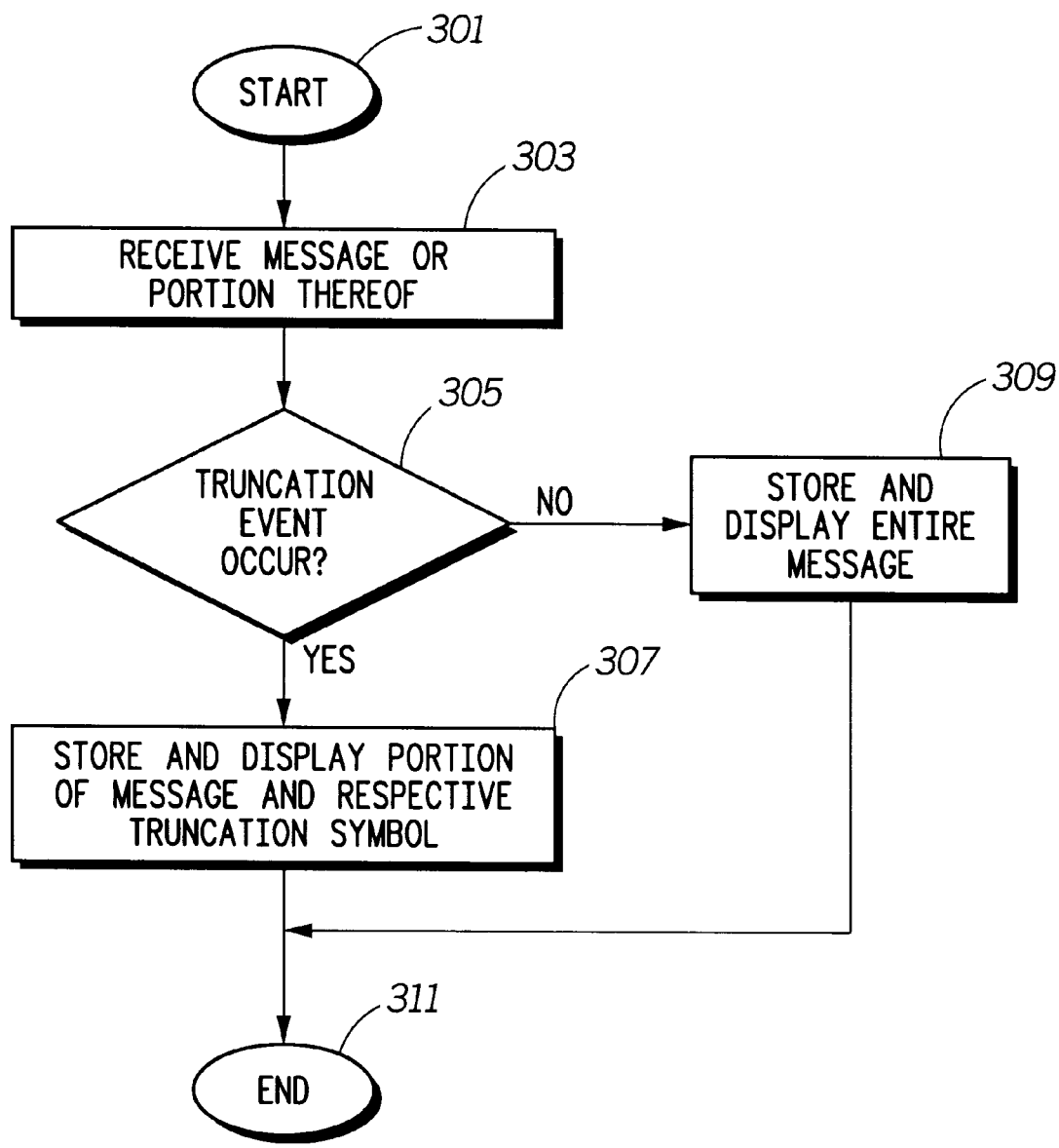
FIG. 3 illustrates a logic flow diagram of steps executed by a communication device in accordance with the present invention.

FIG. 3 illustrates a logic flow diagram 300 of steps executed by a communication device in accordance with the present invention. The logic flow begins (301) when the communication device receives (303) a message or a portion thereof. As the message is received, the communication device determines (305) whether an event has occurred that requires truncation of the message. Such truncation events include, but are not limited to, the event that the entire message cannot be decoded reliably and the event that the message length exceeds a threshold length associated with available memory.

If a truncation event has occurred, the communication device stores and displays (307) a portion of the message together with the respective truncation symbol associated with the particular truncation event. For example, if an uncorrectable message error has occurred, the communication device stores and displays the portion of the message received prior to the uncorrectable error together with a message error truncation symbol. Analogously, if the length of the message exceeds a threshold length associated with available memory, the communication device stores and displays the portion of the message for which memory is available together with a message length truncation symbol.

If, on the other hand, a truncation event has not occurred, the communication device stores and displays (309) the entire message. Once the message or combined message portion and truncation character have been displayed, the logic flow ends (311).

Figure 4:
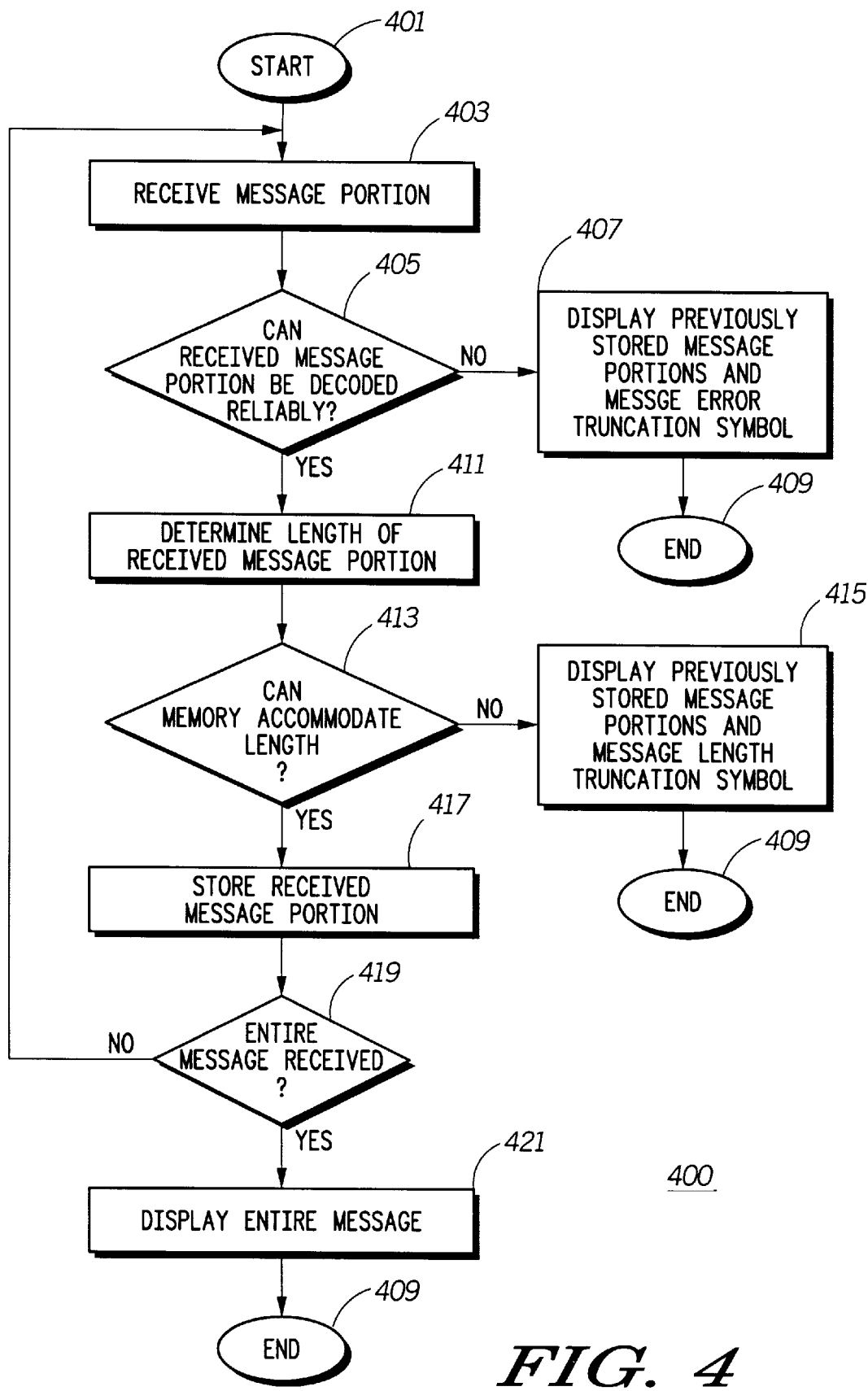
FIG. 4 illustrates a logic flow diagram of steps executed by a communication device in accordance with a preferred embodiment of the present invention.

FIG. 4 illustrates a logic flow diagram 400 of steps executed by a communication device in accordance with a preferred embodiment of the present invention. The logic flow begins (401) when the communication device receives (403) a portion of a transmitted data message. The communication device then determines (405) whether the received message portion can be decoded reliably. For example, if the communication device is a pager utilizing Motorola's "FLEX" protocol, the received message portion might comprise a message fragment, in which case, the communication device determines whether the header of the message fragment can be decoded. If the received message portion cannot be decoded reliably, the communication device displays (407) any previously stored message portions together with a message error truncation symbol and the logic flow ends (409). Such display may be contemporaneous with the determination that the received message portion cannot be decoded reliably or may be a substantial time after such determination depending on the present configuration of the communication device.

If the communication device determines that the received message portion can be decoded reliably, the communication device determines (411) a length of the received message portion. Once the message portion length is determined, the communication device further determines (413) whether the memory allocated for the message that includes the received message portion can accommodate the length of the received message portion. That is, the communication device determines whether the length of the received message portion plus the lengths of previously stored message portions exceeds a threshold length associated with the memory allocated to the entire message containing the received message portion and the previously stored message portions. If the memory cannot accommodate the received message portion, the communication device displays (415) the previously stored message portions together with a message length truncation symbol and the logic flow ends (409). To enable the user of the communication device to easily determine the cause for the truncated display, the message length truncation symbol is different than the message error truncation symbol. Display of the previously stored message portions together with the message length truncation symbol may be contemporaneous with the determination that the memory cannot accommodate the received message portion or may be a substantial time after such determination depending on the present configuration of the communication device.

If, on the other hand, the memory can accommodate the received message portion, the communication device stores (417) the received message portion in memory and determines (419) whether the entire message has been received. Such a determination is made in accordance with the particular communication protocol being utilized in the communication system in which the communication device is operating and is well known. For example, if the communication device is operating in accordance with Motorola's "FLEX" protocol, this determination comprises determining whether all message fragments of the message have been received. If the entire message has been received, the communication device displays (421) the entire message and the logic flow ends (409). If, however, the entire message has not been received, the logic flow returns to block 403 and the communication device receives the next message portion. The display of the entire message may be contemporaneous with the determination that the entire message has been received or may be a substantial time after such determination depending on the present configuration of the communication device.

The present invention encompasses a communication device and a method employed therein to indicate to a user of the communication device that only a portion of a received message can be displayed to the user. With this invention, a user can easily determine the cause of truncation upon viewing a truncated message and its corresponding truncation symbol. For example, use of one truncation symbol to indicate message truncation due to message error and another truncation symbol to indicate message truncation due to message length enables the user of the communication device to quickly differentiate between message error truncations and message length truncations and to take corrective action if possible. For instance, if the user sees, based on the displayed truncation symbol, that a message has been truncated due to message length, the user may be able to re-allocate memory (e.g., by deleting stored messages or the like) to make more memory available for newly received messages. Similarly, if the user sees, based on the displayed truncation symbol, that a message has been truncated due to message error, the user may be able to move closer to the transmitter of the message in an attempt to improve transmission channel quality (e.g., lower channel interference) and thereby reduce the likelihood of message errors. Such truncation cause differentiation and associated corrective action is not possible when only a single truncation symbol is used for all truncations as in the prior art.

While the foregoing constitute certain preferred and alternative embodiments of the present invention, it is to be understood that the invention is not limited thereto and that in light of the present disclosure, various other embodiments will be apparent to persons skilled in the art. Accordingly, it is to be recognized that changes can be made without departing from the scope of the invention as particularly pointed out and distinctly claimed in the appended claims which shall be construed to encompass all legal equivalents thereof.

What is claimed is:

1. A method for a communication device to indicate to a user of the communication device that only a portion of a received message can be displayed to the user, the method comprising the steps of:

displaying the portion of the received message and a first truncation symbol to the user responsive to a first truncation event, the first truncation symbol indicating that display of the received message has been truncated as a result of the first truncation event; and displaying the portion of the received message and a second truncation symbol to the user responsive to a second truncation event, the second truncation symbol being different than the first truncation symbol and indicating that display of the received message has been truncated as a result of the second truncation event.

2. The method of claim 1, wherein the first truncation event comprises the event that a length of the received message exceeds a threshold message length.

3. The method of claim 1, wherein the first truncation event comprises the event that only the portion of the received message can be decoded reliably.

4. The method of claim 3, wherein the communication device includes a processor for decoding the message, wherein the message includes a plurality of message fragments, wherein each message fragment includes a header and corresponding data, and wherein the step of displaying the portion of the received message and the first truncation symbol comprises the step of displaying at least a first message fragment and the first truncation symbol to the user in the event that the header of at least a second message fragment cannot be decoded by the processor.

5. The method of claim 1, further comprising the step of:

storing only the portion of the received message to be displayed to the user.

6. The method of claim 1, wherein the communication device comprises at least one of a pager, a two-way radio, a radiotelephone, and a wireless data device.

7. A method for a communication device to acquire information and display the information to a user of the communication device, the method comprising the steps of:

receiving at least a first portion of a data message;

storing the at least a first portion of the data message in a memory of the communication device;

receiving at least a second portion of the data message;

determining whether the at least a second portion of the data message can be decoded reliably;

displaying the at least a first portion of the data message and a first truncation symbol in the event that the at least a second portion of the data message cannot be decoded reliably;

determining whether the at least a second portion of the data message can be stored in the memory; and displaying the at least a first portion of the data message and a second truncation symbol in the event that the at least a second portion of the data message can be decoded reliably, but cannot be stored in the memory, wherein the second truncation symbol is different than the first truncation symbol.

8. The method of claim 7, wherein the communication device includes a processor for decoding the data message, wherein the data message includes a plurality of message fragments, wherein each message fragment includes a header and corresponding data, and wherein the step of displaying the at least a first portion of the received message and the first truncation symbol comprises the step of displaying at least a first message fragment and the first truncation symbol to the user in the event that the header of at least a second message fragment cannot be decoded by the processor.

9. A communication device, comprising:

a receiver for receiving a data message;

a processor, operably coupled to the receiver, for determining a plurality of truncation events associated with processing of the data message; and a display, responsive to the processor, for displaying a first portion of the data message and a first truncation symbol responsive to a first truncation event of the plurality of truncation events, the first truncation symbol indicating that display of the data message has been truncated as a result of the first truncation event, and for displaying a second portion of the data message and a second truncation symbol responsive to a second truncation event of the plurality of truncation events, the second truncation symbol being different than the first truncation symbol and indicating that display of the data message has been truncated as a result of the second truncation event.

10. The communication device of claim 9, wherein the processor determines whether only a first portion of the data message can be decoded reliably to determine the first truncation event.

11. The communication device of claim 10, wherein the display displays the first portion of the data message and the first truncation symbol in the event that only the first portion of the data message can be decoded reliably.

12. The communication device of claim 10, wherein the processor determines whether a length of the data message exceeds a threshold length to determine the second truncation event.

13. The communication device of claim 12, wherein the display displays the second portion of the data message and the second truncation symbol in the event that the length of the data message exceeds the threshold length.

14. The communication device of claim 12, further comprising a memory, operably coupled to the processor, for storing only the second portion of the data message in the event that the length of the data message exceeds the threshold length.

15. The communication device of claim 9, wherein the processor determines whether a length of the data message exceeds a threshold length to determine the first truncation event.

16. The communication device of claim 15, wherein the display displays the first portion of the data message and the first truncation symbol in the event that the length of the data message exceeds the threshold length.

17. The communication device of claim 9, wherein the communication device comprises at least one of a pager, a two-way radio, a radiotelephone, and a wireless data device.

* * * * *